A. B. ANTISELL.
AGITATOR IMPLEMENT.
APPLICATION FILED OCT. 15, 1918.
1,305,432.
Patented June 3, 1919.
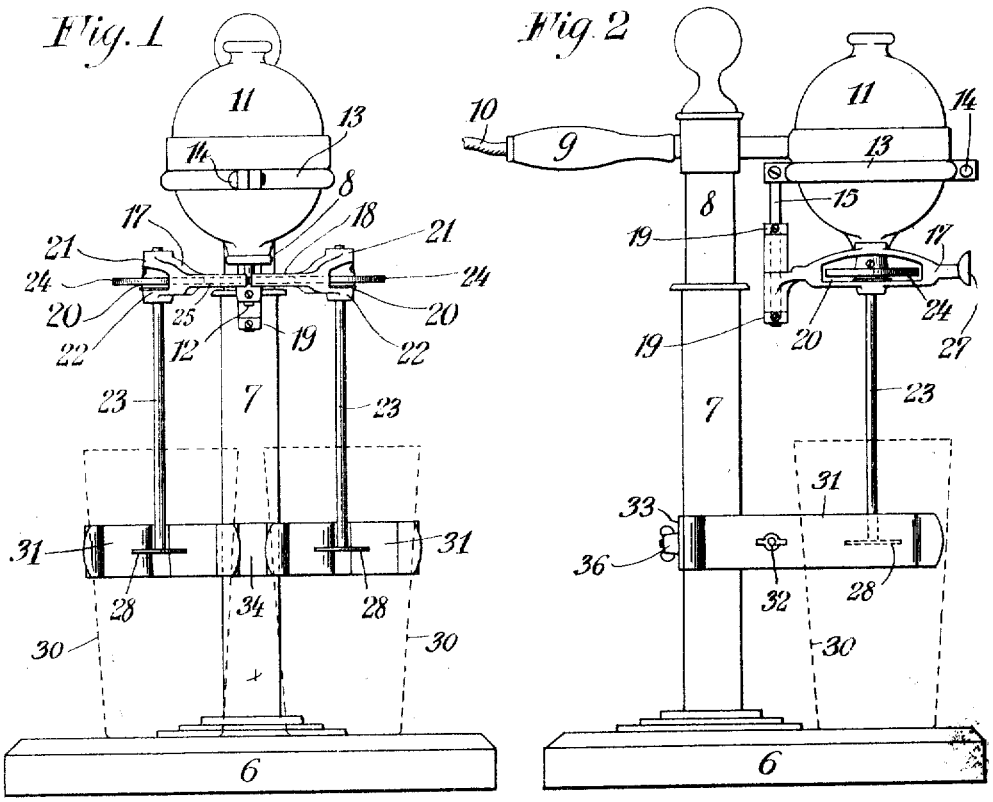
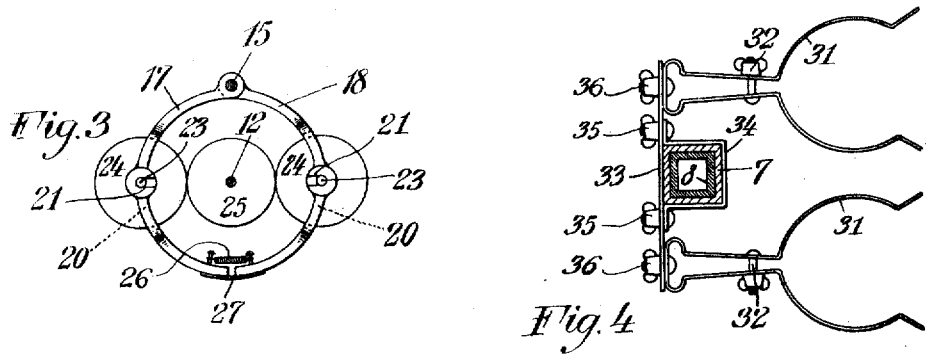
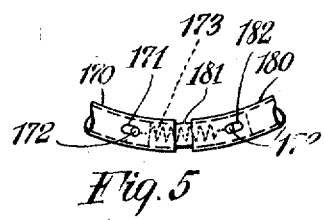
Alfred B. Antisell INVENTOR
BY Ivan E. A. Konigsberg
ATTORNEY

UNITED STATES PATENT OFFICE.

ALFRED B. ANTISELL, OF NEW YORK, N. Y., ASSIGNOR TO H. B. GIBSON CO., INC., OF NEW YORK, N. Y., A CORPORATION OF NEW YORK.

AGITATOR IMPLEMENT.

1,305,432.      Specification of Letters Patent.      Patented June 3, 1919.

Application filed October 15, 1918. Serial No. 258,182.

*To all whom it may concern:*

Be it known that I, ALFRED B. ANTISELL, a citizen of the United States, and resident of New York city, in the county of New York and State of New York, have invented certain new and useful Improvements in Agitator Implements, of which the following is a specification.

This invention relates to improvements in agitator implements of the type shown in the U. S. Patent Number 1,005,653, dated October 10, 1911. The object of the invention is to provide means preferably in the form of an attachment, for increasing the capacity of a single-agitator apparatus.

To this end my invention comprises various structural details and combination of parts as set forth hereinafter with reference to the accompanying drawing in which—

Figure 1 is a front elevation of a beverage mixer of the type referred to equipped with an attachment embodying my invention;

Fig. 2 is a side elevation of Fig. 1;

Fig. 3 is a plan view, of parts of my attachment;

Fig. 4 is a plan view of the clips for supporting the vessels containing the liquid to be mixed or stirred, and Fig. 5 shows a modification.

The mixer or apparatus is of the type generally used for mixing beverages at soda water fountains and comprises a base 6 supporting a hollow post 7 into which is fitted a vertically adjustable hollow standard 8 provided with a handle 9, through which passes a cable 10 for supplying electric current to the motor 11 suitably supported on said standard 8. As the mixer referred to is well known to the art and is in general public use, it will suffice for the purposes of this disclosure to state, that a suitable make and break device is installed within the standard 8 and post 7 so that when the standard 8 is telescoped within the post as shown, the current is on and the motor is in operation, while, when the standard is in its extreme elevation, the current is cut off from the motor, all as fully set forth in the said patent.

The reference numeral 12, Figs. 1 and 3, denotes the motor shaft which ordinarily is provided with a suitable agitator implement at its extreme lower end. In operation, a container with the liquid to be mixed is placed below the motor, the latter is lowered so that the agitator implement is submerged in the liquid. The motor then starts automatically and the beverage is mixed. When the motor is elevated, the current is cut off and the beverage is ready for consumption.

It has, however, been found, that due to the popularity of mixed beverages, the capacity of a single-agitator mixer is insufficient to meet the demand. The object of the present invention is therefore to improve the construction of the mixer so that more than one beverage may be mixed at one time. Preferably, the object of the invention is accomplished by providing at least two agitators to be driven by the motor, and by arranging them so that they may be readily attached to the single-agitator mixer.

To this end I propose to clamp to the motor a supporting bracket 13 in the form of a split ring adapted to be clamped firmly to the motor by a screw 14, as will be readily understood. The bracket carries a depending post or hinge pin 15. On the latter is pivotally supported an annular bearing member comprising two semi-circular halves 17 and 18. The bearing members are supported on the post 15 aforesaid by collars 19, 19 and it will be understood from Fig. 3 that the two halves 17 and 18 may be opened and closed on said post with respect to each other.

Each half-bearing 17 and 18 is bifurcated as at 20, 20 and provided with an upper and lower bearing 21 and 22 for the reception of the agitator shafts 23, as shown. Each shaft 23 carries a drive disk or wheel 24, preferably of brass and which operate freely within the bifurcated portions 20 as shown. When the two halves of the member 16 are closed, the drive disks 24 are brought into contact with a friction drive element 25, which may be a disk or wheel of suitable material carried by the motor shaft 12. When the two bearing halves 7 and 18 are closed, the driving elements 24 are kept in frictional contact with the drive disk 25 by a suitable spring. 26 or other means. A name plate (omitted in Fig. 1) or ornament 27 may be provided to cover the break between the two bearing halves as shown in Fig. 3. The ends of the agitator shafts are each provided with a suitable agitator 28.

In order to facilitate the placing of glasses or other containers 30, 30, in their proper position with respect to the shafts 23, there is secured to the post 7 a pair of clips 31, 31, adapted to receive and yieldingly hold the glasses. The clips may be adjusted by the bolts and wing nuts 32. The clips are carried by a clamp comprising the members 33 and 34 detachably secured to the post 7 by bolts and nuts 35 and the clips are in turn removably mounted on the members 33 by bolts and nuts 36.

From the foregoing it will be seen that when the motor is lowered, as shown in the drawing, the two agitator shafts are driven simultaneously and that either one or two glasses may be placed in position for the mixing of beverages. Also, that the attachment may be quickly removed by unhooking the spring 26 and opening up the bracket 13. The glass clips may be readily removed by loosening the bolts at 36.

In the instance illustrated the capacity of the mixer has been doubled, but it is obvious that the disclosure suggests by mere adaptation, an arrangement for operating more than two agitators. This, however, may be of doubtful practical utility.

In Fig. 5 I have shown a modified construction of the locking means for the two bearing halves 17 and 18. In this instance the latter are made tubular and denoted 170 and 180. To one of them is secured a bridging member 181. A slot 182 is provided in the joined members 180 and 181. A similar slot 171 is provided in the member 170. Pins 172 are inserted in the slots and a spring 173 operates to keep the members together as will be understood.

It should be noted that the bearings 21 and 22 for the agitator shafts 23 are open or of forked construction to facilitate the insertion of the said shafts therein, as will be readily understood from Fig. 3.

It is obvious that structural details and the like may be changed without departing from the principle of invention, which is that of providing suitable means for operating more than one agitator implement from the one motor.

I claim—

1. The combination of a standard, a post in telescopic union with said standard, a motor carried by said post, a bracket detachably clamped to said motor, a pair of agitator implements pivotally mounted on said bracket and means for operating said agitator implements from the said motor.

2. The combination of a standard, a post in telescopic union therewith, a motor in said post, a motor shaft, a bracket detachably clamped to said motor, a plurality of agitator implements pivotally secured to said bracket driving wheels on said implements and said motor shaft and means for maintaining said driving wheels in frictional driving contact.

3. The combinaton of a motor, a bracket detachably secured to the same, bearing members pivotally mounted on said bracket, agitator implements detachably mounted in said bearing members and means for operating said agitator implements from the said motor.

4. The combination of a motor, a bracket secured thereto, a depending post on said bracket, bearing members pivoted on said post, a plurality of shafts mounted in said bearing members, agitators carried by said shafts and means for driving said shafts from the said motor.

5. An attachment of the character described comprising a bracket, semi-circular bearing members pivotally connected to said bracket, shafts supported by said bearing members, agitator implements supported on said shafts and means for operating said agitator implements.

6. A device of the character described comprising a motor, supporting means therefor, a bracket, means for clamping said bracket to said motor, a pair of opposed arms pivoted on said bracket, open bearings in said arms, agitator shafts in said open bearings and means for driving said agitator shafts from the said motor.

7. A device of the character described comprising a motor, supporting means therefor, a bracket, means for clamping said bracket to said motor, a pair of opposed arms pivoted on said bracket, open bearings in said arms, agitator shafts in said open bearings and means for driving said agitator shafts from the said motor, and yielding means for connecting the free ends of the said arms.

Signed at New York, in the county of New York and State of New York, this third day of October, A. D. 1918.

ALFRED B. ANTISELL.